March 31, 1959   H. V. LICHTENBERGER ET AL   2,880,155
CONTROL FOR NEUTRONIC REACTOR
Filed May 31, 1956   2 Sheets-Sheet 1

INVENTORS
Harold V. Lichtenberger
Reid R. Cameron
BY
Roland A. Anderson
Attorney

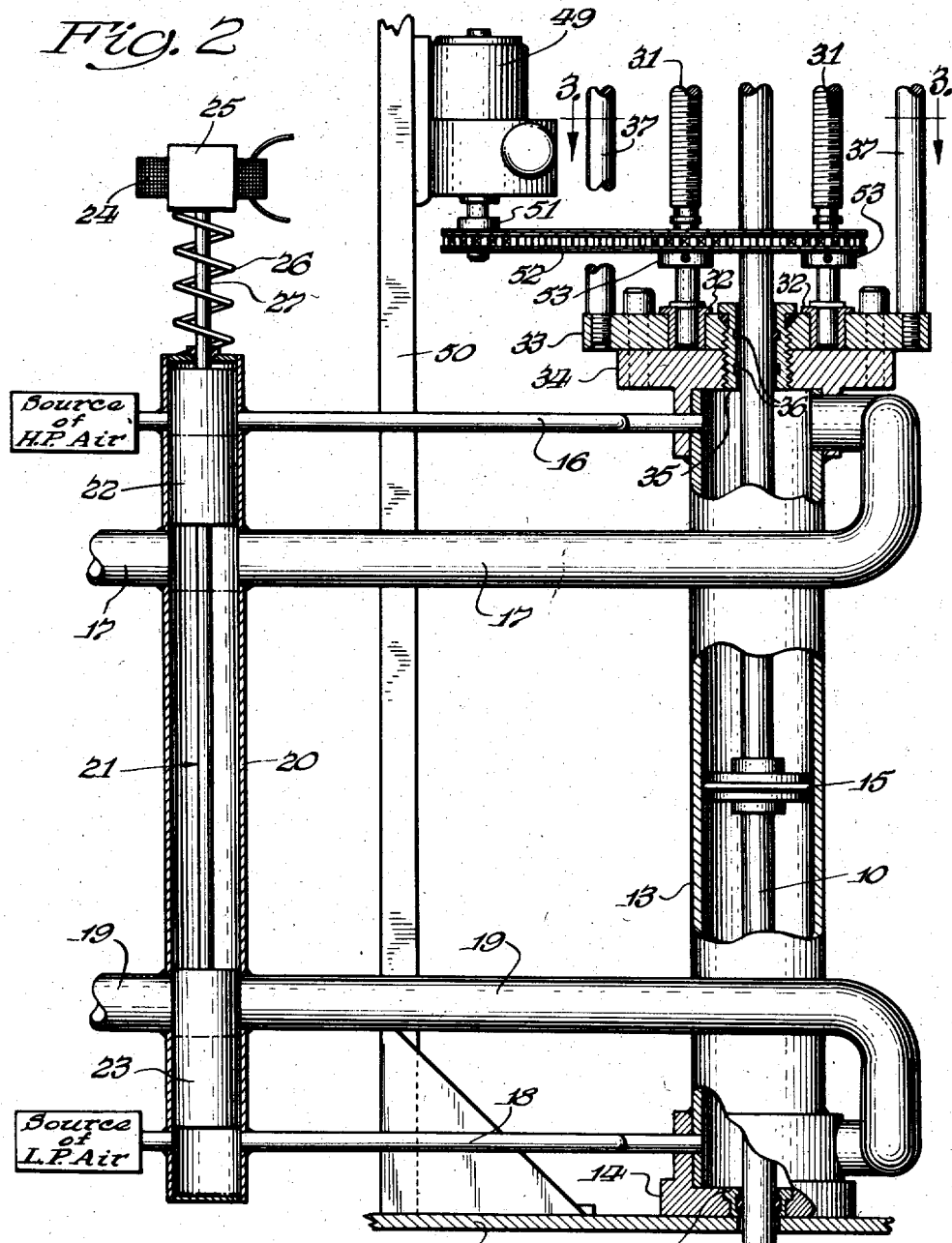

United States Patent Office 2,880,155
Patented Mar. 31, 1959

2,880,155

CONTROL FOR NEUTRONIC REACTOR

Harold V. Lichtenberger, Idaho Falls, Idaho, and Reid A. Cameron, Danville, Calif., assignors to the United States of America as represented by the United States Atomic Energy Commission Application May 31, 1956, Serial No. 588,577

3 Claims. (Cl. 204—193.2)

This invention relates to a control for a neutronic reactor, and more specifically to a control that is effective when extreme conditions arise in the operation of the reactor.

Certain types of neutronic reactors are controlled by the vertical shifting of a neutron-absorbing rod with respect to the reactor. For the theory and operation of such rods reference is made to columns 51–56 of Fermi et al. Patent No. 2,708,656, dated May 17, 1955. It is desirable to have the absorbing rod so associated with the lifting mechanism for moving it that in the event of emergency the absorbing rod can be moved rapidly, independently of the mechanism, to shut down the reactor. One arrangement for accomplishing this involves an adjustable stop actuated by a mechanism and a follower tied to the absorbing rod, which follower is caused to follow the stop without being mechanically connected thereto. The drawback with this arrangement is that if the absorbing rod becomes stuck and so the follower lags behind the stop, the stop will automatically move too far, and the absorbing rod, if freed, would also move too far and perhaps too fast, with the result that the reactor might be operated in a dangerous manner.

The present invention overcomes this by providing for a reversal of movement of the absorbing rod which will shut down the reactor in the event that the follower element fails to follow or becomes separated from the adjustable stop.

In the drawings:

Fig. 2 is a similar view of the lower portion of the control apparatus;

Figure 1:
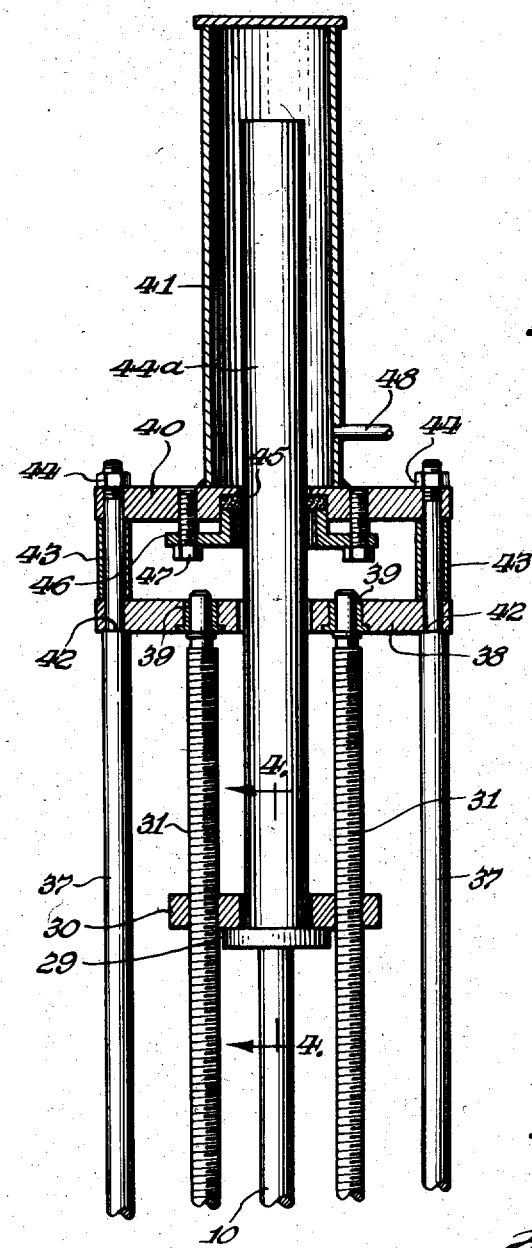
Fig. 1 is an elevational view, partly in section, of the upper portion of the control apparatus of the present invention.

The reference character 10 designates a control rod, an upper portion of which is seen in Fig. 2 to extend upwardly from a reactor (not shown) through a plate 11 and a seal 12 into a cylinder 13. A lower portion of the control rod is formed of neutron-absorbing material such as cadmium or hafnium and is insertable into the reactor. The plate 11 is secured to the top of the reactor, and the seal 12 is mounted in a base 14 which is secured to the plate 11 and in which the lower end of the cylinder 13 is secured.

The control rod 10 carries a piston 15 which slides within the cylinder 13. The cylinder 13 is connected at its upper end with an intake line 16 and an exhaust line 17, both for high-pressure air, and at its lower end with an intake line 18 and an exhaust line 19, both for low-pressure air. The intake lines 16 and 18 are, respectively, connected with sources of high-pressure air and low-pressure air through a valve housing 20, which is also connected in the exhaust lines 17 and 19.

A sliding valve 21 operates in the valve housing 20 and comprises an upper portion 22 adapted to block the exhaust line 17 and to disconnect the intake line 16 from the source of high-pressure air and a lower portion 23 adapted to block the exhaust line 19 and to disconnect the intake line 18 from the source of low-pressure air. The position of the valve 21 is controlled by a solenoid coil 24, an armature 25, and a tension spring 26. The armature 25 is connected with the upper end of the valve 21 by a rod 27 which extends through the top of the valve housing 20. The ends of the tension spring 26 are connected to the armature 25 and the top of the valve housing 20. When the solenoid coil 24 is energized, the armature 25 and valve 21 occupy the position of Fig. 2, in which the upper portion 22 of the valve disconnects the intake line 16 from the source of high-pressure air and unblocks the exhaust line 17 and the lower portion 23 of the valve blocks the exhaust line 19 and permits the valve housing 20 to connect the intake line 18 with the source of low-pressure air. When the coil 24 is deenergized, gravity and the tension spring 26 shift the portions 22 and 23 of the valve 21 downward to the dash-dot position of Fig. 2, in which the intake line 16 is connected with the source of high-pressure air, the exhaust line 17 is blocked, the intake line 18 is disconnected from the source of low-pressure air, and the exhaust line 19 is unblocked.

Figure 4:
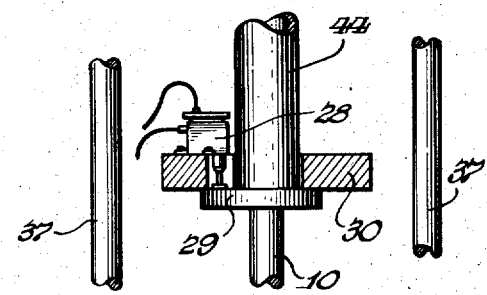
Fig. 4 is a vertical sectional view taken on the line 4—4 of Fig. 1.

The solenoid coil 24 is connected with a source of electrical power, not shown and with a switch 28, which, as shown in Fig. 4, is closed when a follower 29, formed as a shoulder on the control rod 10, engages a stop 30, on which the switch 28 is mounted. As shown in Fig. 1, the stop 30 is carried by two threaded members 31 which extend through the stop 30 and have engagement with threaded holes therein, so that rotation of the members 31 in one direction adjusts the stop 30 upwards and rotation of the members 31 in the opposite direction adjusts the stop 30 downwards. As shown in Fig. 2, the members 31 are journaled and vertically supported at their lower ends in bearings 32 mounted in a plate 33 secured to a head 34 in which the top of the cylinder 13 is secured. A fitting 35 is mounted in the plate 33 and the head 34 and carries seals 36, which act against the portion of the control rod 10 protruding from the top of the cylinder 13.

A plurality of rods 37 have threaded connection at their lower ends with the plate 33 for support thereby. As shown in Fig. 1, the upper ends of the rods 37 support a plate 38 which carries bearings 39 journaling the upper ends of the threaded members 31. The upper ends of the rods 37 also carry a plate 40 to which a cylinder 41 is secured. The plate 38 rests against shoulders 42 on the rods 37, and the plate 40 is spaced from the plate 38 by tubular sections 43 carried by the rods 37. Nuts 44 on the rods 37 retain the plate 38 against the shoulders 42 and the plate 40 against the tubular sections 43.

The control rod 10 carries above the follower 29 a tubular extension 44a which is closed at its upper end and protrudes through the plates 38 and 40 into the cylinder 41. The plate 40 carries a seal 45 which is adjustably pressed against the tubular extension 44a by a clamping member 46 and screws 47 which extend through the clamping member 46 and are threaded into the plate 40.

The cylinder 41 is connected by a line 48 with the reactor in a manner, not shown, so that any fluid pressure acting against the lower end of the control rod to move it upwardly out of the reactor would be balanced by the same fluid pressure transmitted from the reactor to the top of the control-rod extension 44a through the line 48 and the cylinder 41.

Figure 3:
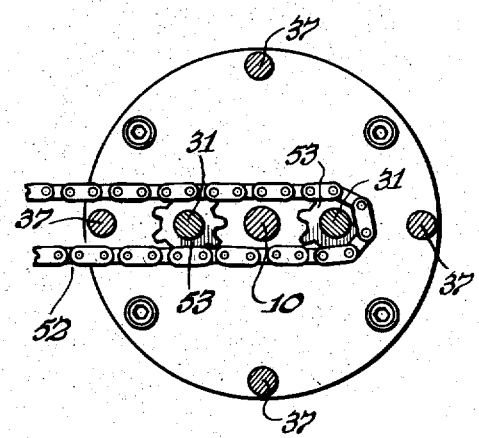
Fig. 3 is a horizontal sectional view taken on the line 3—3 of Fig. 2.

As shown in Figs. 2 and 3, the threaded members 31 which adjust the position of the stop 30 are rotated by a reversible motor 49, which is secured to an upright 50 secured to and extending upwardly from the plate 11. The motor 49 is drivingly connected with the rotatable members 31 through a gear 51 on the motor, a sprocket chain 52 meshing with the gear 51, and gears 53 meshing with the sprocket chain 52 and secured to the rotatable members 31.

When the reactor is started up, the stop 30 will be in its lowest position and thus in engagement with the follower 29, with the result, as previously explained, that the switch 28 is closed, the coil 24 is energized, and the portions 22 and 23 of the valve 21 are in the full-line position of Fig. 2. Thus the portion of the cylinder 13 above the piston 15 can exhaust through the exhaust line 17 and the portion of the cylinder 13 below the piston 15 is connected with the source of low-pressure air through the intake line 18. Now as more reactivity is called for by upward adjustment of the stop 30 by suitable rotation of the threaded members 31, the low-pressure source acts against the piston to make the rod 10 follow the stop 30 upward, maintaining contact between the follower 29 and the stop 30, a closed condition of the switch 28, and a continued energization of the coil 24. If the reactivity becomes too high, the motor 49 is reversed, the stop 30 goes down automatically, acting by contact with the follower 29 to lower the control rod 10 into the reactor. Such downward movement of the control rod is possible, because it is only impositively urged upwardly by the action of the source of low-pressure air against the piston 15. The motor 49 is, of course, powerful enough to move the stop 30 downward against the upward push of the low-pressure air against the piston 15.

If the control rod 10 in its upward movement to produce a higher level of reactivity should stick, the stop 30 would not rise just to the level appropriate to a given value of reactivity but would go beyond it to a level appropriate to a higher value of reactivity, because the sticking of the control rod at the original lower level would produce merely a lower value of reactivity. Now if the control rod 10 should suddenly become freed, it would rise to an excessively high level and create an excessively high value of reactivity creating a runaway condition in the reactor.

This possible condition is avoided by the novel control of the present invention, for when the control rod 10 sticks, a rise of the stop 30 results in loss of contact between the stop 30 and follower 29, opening of switch 28, deeneregization of the coil 24, and movement of the valve portions 22 and 23 to the dash-dot position of Fig. 2, in which the upper side of the piston 15 is connected with the source of high-pressure air and the lower side of the piston 15 is connected to exhaust, whereby the control rod 10 is rapidly driven downward into the reactor so as to shut it down.

It is to be noted that the control of the present invention is adequately sensitive to emergency conditions other than sticking of the control rod 10. If the reactivity level became dangerously high, the circuit in which the coil 24 is connected would be opened, resulting in deenergization of the coil 24 and dropping of the valve portions 22 and 23 to the dash-dot position of Fig. 2, as aforesaid. The control rod 10 would be rapidly inserted in the reactor through the action of the source of high-pressure air, and this would take place immediately and without interference from the adjustable stop 30, which governs the reactivity level, since the relationship of the stop 30 and the follower 29 causes the stop 30 to interfere only with upward movement of the control rod, not with downward movement thereof. In the same way, an electric-power failure would result in deenergization of the coil 24 and immediately downward movement of the control rod 10 into the reactor.

The intention is to limit the invention only within the scope of the appended claims.

What is claimed is:

1. An apparatus for shifting a control rod with respect to a neutronic reactor, said apparatus comprising a stop shiftable in the direction in which the control rod is to be shifted, a follower connected with the control rod and engageable with the stop, means for causing the follower to follow the stop in one direction, and means responsive to disengagement of the stop from the follower by movement in the said one direction for causing the control rod to move in the opposite direction.

2. The apparatus specified in claim 1; the control rod being lifted out of the reactor to decrease reactivity thereof; the means for causing the follower to follow the stop including a cylinder, a piston located in the cylinder and attached to the follower, and means to supply pressure fluid to one end of the cylinder; the means for causing the follower to move in the opposite direction in response to disengagement of the stop from the follower including means for supplying pressure fluid to the other end of the cylinder.

3. The apparatus specified in claim 2, low pneumatic pressure urging the follower in one direction against the stop, high pneumatic pressure urging the follower in the opposite direction in the event the stop has moved out of contact with the follower.

References Cited in the file of this patent

AECD–3668, Dietrich, "Experimental Investigation of the Self Limitation of Power During Reactivity Transients in a Subcooled, Water-Moderated Reactor," 1954; declassified August 17, 1955.